(12) United States Patent
Miura et al.

(10) Patent No.: US 7,102,318 B2
(45) Date of Patent: Sep. 5, 2006

(54) SERVO MOTOR WITH A BUILT-IN DRIVE CIRCUIT

(75) Inventors: Hiromasa Miura, Nagano-ken (JP); Toshiyuki Noda, Nagano-ken (JP)

(73) Assignee: Tamagawa Seiki Kabushiki Kaisha, Nagano-ken (JP)

( * ) Notice: Subject to any disclaimer, the term of this patent is extended or adjusted under 35 U.S.C. 154(b) by 0 days.

(21) Appl. No.: 10/787,595

(22) Filed: Feb. 27, 2004

(65) Prior Publication Data

US 2004/0174133 A1 Sep. 9, 2004

(30) Foreign Application Priority Data

Mar. 6, 2003 (JP) ............... 2003-059580

(51) Int. Cl.
*G05B 1/06* (2006.01)
(52) U.S. Cl. .............. 318/652; 318/138; 318/254; 318/439; 318/600; 318/638; 318/650
(58) Field of Classification Search ........... 318/138, 318/254, 439, 700, 800, 801, 600–652
See application file for complete search history.

(56) References Cited

U.S. PATENT DOCUMENTS

| 4,529,900 | A | | 7/1985 | Uzuka | |
|---|---|---|---|---|---|
| 5,327,064 | A | * | 7/1994 | Arakawa et al. | 318/801 |
| 5,912,541 | A | * | 6/1999 | Bigler et al. | 318/600 |
| 6,819,068 | B1 | * | 11/2004 | Horng et al. | 318/254 |
| 7,042,188 | B1 | * | 5/2006 | Miura et al. | 318/652 |
| 2004/0239196 | A1 | * | 12/2004 | Miura et al. | 310/77 |

FOREIGN PATENT DOCUMENTS

| EP | 0 874 442 | 10/1998 |
|---|---|---|
| EP | 1 184 905 | 3/2002 |
| GB | 2 227 891 | 8/1990 |
| GB | 2 251 522 | 7/1992 |
| GB | 2 355 860 | 5/2001 |
| JP | 4-210753 | 7/1992 |
| JP | 4-111271 | 9/1992 |
| JP | 9-84302 | 3/1997 |
| KR | 2000-0055052 | 9/2000 |

* cited by examiner

*Primary Examiner*—Lincoln Donovan
*Assistant Examiner*—Tyrone Smith
(74) *Attorney, Agent, or Firm*—Wenderoth, Lind & Ponack, L.L.P.

(57) ABSTRACT

A servo motor with a built-in drive circuit in which a sensor circuit portion, a drive control circuit portion, and a motor drive circuit are collectively provided on two boards, thereby achieving simplification and a reduction in the size of the circuit configuration. In the servo motor with the built-in drive circuit, the sensor circuit portion and the drive control circuit portion are formed on a sensor circuit board, and the motor drive circuit is formed on a motor drive board, thereby achieving a reduction in size.

8 Claims, 2 Drawing Sheets

SERVO MOTOR WITH A BUILT-IN DRIVE CIRCUIT

BACKGROUND OF THE INVENTION

1. Field of the Invention

The present invention relates to a servo motor with a built-in drive circuit. In particular, the present invention relates to a novel improvement of a servo motor for achieving a reduction in size. The reduction in size of the servo motor can be attained such that a sensor circuit board is equipped with a sensor circuit portion and a drive control circuit portion, and that a motor drive board with a power device for driving a stator winding and the sensor circuit board are arranged side by side in a sensor cover.

2. Description of the Related Art

A motor encoder construction may be mentioned as an example of a conventionally used servo motor with a built-in drive circuit of this type (see, for example, JP 62-278408 A and U.S. Pat. No. 5,912,541).

In the motor encoders as disclosed in JP 62-278408 A and U.S. Pat. No. 5,912,541, the motor portion is integrated with the encoder, and the drive circuit portion as a driver is constructed in the form of a casing separated from the motor main body.

The conventional motor with a brake is constructed as described above, and therefore has the following problems.

In the driver of the conventional construction, isolation between the boards is necessary since the sensor board for the encoder, the drive control board for drive control, and the motor drive board for driving the stator winding exist independently each other. Further, it is necessary to effect mutual transmission and reception of signals, which requires a large number of ICs.

Thus, the servo motor as a whole including the driver is rather large, which leads to a serious obstacle to a reduction in the size of a machine tool, robot, or the like when a large number of servo motors are used simultaneously for multi-axis control.

SUMMARY OF THE INVENTION

The present invention has been made with a view toward solving the above problem in the prior art. An object of the present invention is, in particular, to provide a servo motor with a built-in drive circuit in which the sensor portion, the drive control portion, and the motor control portion are considered as one integral circuit, in which the sensor circuit board is equipped with a sensor circuit portion and a drive control circuit portion, and in which a motor drive board with a power device for driving the stator winding and the sensor circuit board are arranged side by side inside a sensor cover, thereby achieving a reduction in size.

According to the present invention, a servo motor with a built-in drive circuit in which a servo motor portion composed of a stator and a rotor is servo-driven by a sensor circuit portion, a drive control circuit portion, and a motor drive circuit, in which the sensor circuit portion and the drive control circuit portion are provided on a sensor circuit board. Further, a sensor cover covering an encoder is provided at an end of the servo motor portion, and a power device of the motor drive board is held in contact with an inner surface of the sensor cover. Further, the sensor circuit board and the motor drive board are arranged side by side inside the sensor cover so as to be axially spaced apart from each other with their outer diameters being smaller than the inner diameter of the sensor cover and the outer diameter of the servo motor portion. Further, the sensor cover is formed of aluminum and has a cooling fin.

DETAILED DESCRIPTION OF THE PREFERRED EMBODIMENT

A servo motor with a built-in drive circuit according to a preferred embodiment of the present invention is described hereinafter with reference to the drawings.

Figure 1:
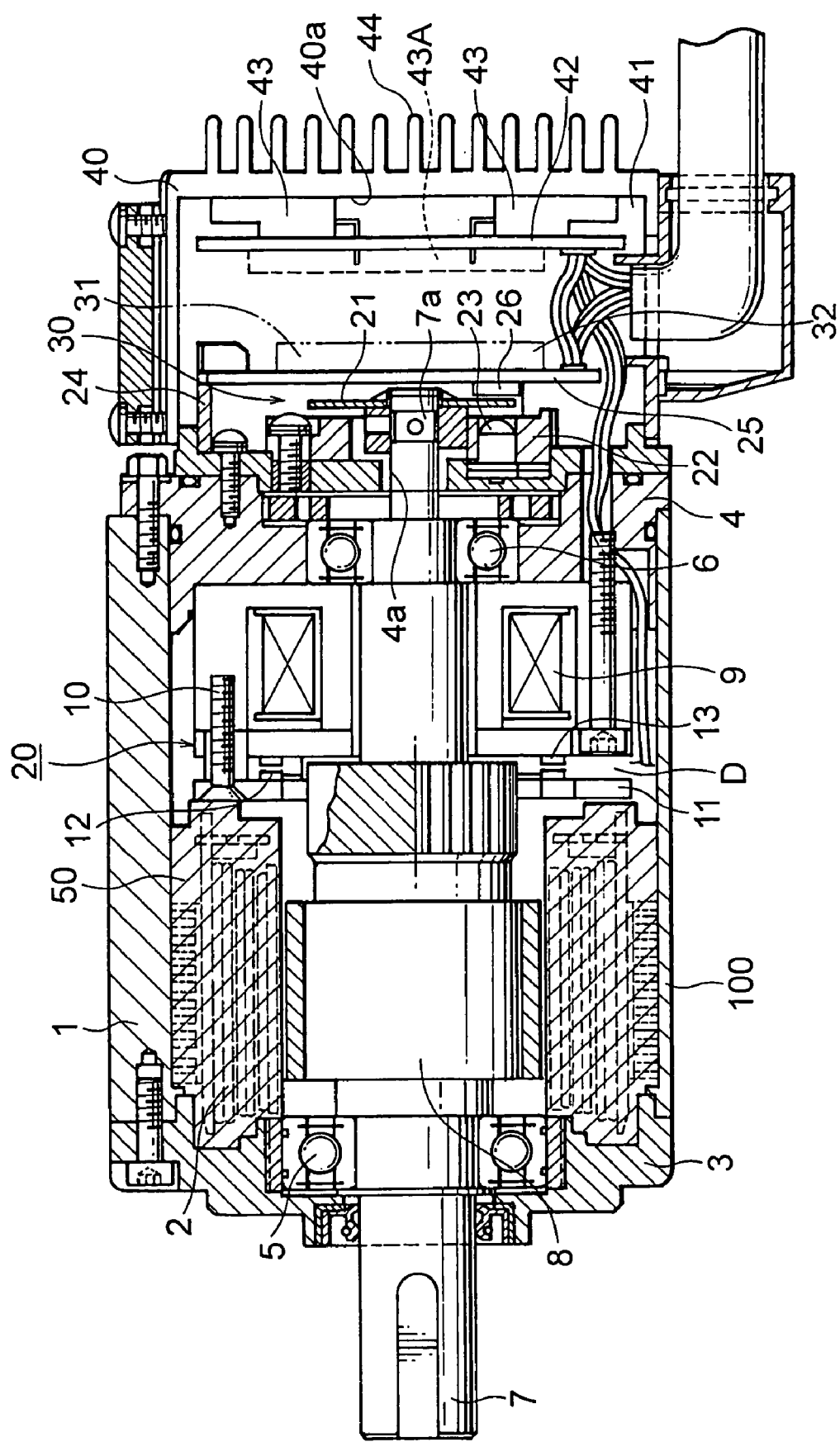
FIG. 1 is a sectional view of a servo motor with a built-in drive circuit according to the present invention.

In FIG. 1, reference numeral 1 indicates a cylindrical case having a stator 50 around which a stator winding 2 is wrapped. A front cover 3 and a rear cover 4 are mounted to both ends of the cylindrical case 1.

A rotation shaft 7 is rotatably supported by bearings 5 and 6 respectively provided in the front cover 3 and the rear cover 4. A rotor 8 situated inside the stator 50 is rotatably provided, and an electromagnetic drive portion 9 is provided in the rear cover 4. The stator 50, the rotor 8, and an absolute encoder 30 form a servo motor portion 100.

A stationary plate 11 is secured to the front cover 3 side of the electromagnetic drive portion 9 through the intermediation of a bolt 10 so as to maintain a gap D therebetween.

A stationary brake plate 12 and a movable brake plate 13 are arranged in the gap D. The stationary brake plate 12 is secured to the rotor 8 side, and the movable brake plate 13 is connected to the electromagnetic drive portion 9 through the intermediation of a well-known spring (not shown).

Thus, when the electromagnetic drive portion 9 is not being energized, the movable brake plate 13 is caused to abut the stationary brake plate 12 by the resilient force of the spring to secure the rotation of the rotor 8. When the electromagnetic drive portion 9 is energized, the movable brake plate 13 is pulled against the resilient force of the spring to thereby release the stationary brake plate 12, making it possible for the rotor 8 to rotate.

The stationary brake plate 11, the movable brake plate 13, and the electromagnetic drive portion 9 form the electromagnetic mechanical brake 20, which is of a well-known type.

The rotation shaft 7 has a protruding shaft 7a, which is passed through an opening 4a of the rear cover 4 to protrude therefrom. The protruding shaft 7a is equipped with a code plate 21, and a retaining plate 22 provided on the rear cover 4 is equipped with a light emitting member 23.

A sensor circuit board 25 composed of a printed board is provided on the rear cover 4 through the intermediation of a support member 24, and is secured in position on the outer side, that is, the rear side, of the code plate 21.

A light receiving member 26 is provided on one surface of the sensor circuit board 25. The light emitting member 23, the code plate 21, and the light receiving member 26 constitute an encoder 30 which serves as a rotation detector. It is also possible to use a well-known resolver instead of this encoder.

Provided on the other surface of the sensor circuit board 25 are a well-known sensor circuit portion 31 composed of an IC and a drive control circuit portion 32. The sensor circuit portion 31 performs power and signal processing on the encoder 31, thus supplying the encoder signal to the drive control circuit portion 32.

A cup-shaped sensor cover 40 formed of a material having a satisfactory heat radiation property, such as aluminum, (other materials are possible) is mounted to the rear side of the rear cover 4 so as to cover the encoder 30.

On the inner surface of the sensor cover 40, a holder 41 is provided, to which a motor drive board 42 composed of a printed board is mounted. The motor drive board 42 has a power device 43 composed of a power transistor or the like, which is held in contact with and joined to the inner surface 40a of the sensor cover 40, thus allowing heat transmission and heat radiation.

On the surface of the sensor cover 40, cooling fins 44 are formed, by means of which heat radiation with high efficiency is possible.

As is well known in the art, on the motor drive board 42, a motor drive circuit 43A for driving the three-phase stator winding 2 by the power device 43 is provided, and the drive control circuit portion 32 controls the motor drive circuit 43A.

The outer diameters of the sensor circuit board 25 and the motor drive board 42 are smaller than the inner diameter of the sensor cover 40 and the outer diameter of the servo motor portion 100. The sensor circuit board 25 and the motor drive board 42 are arranged side by side inside the sensor cover 40, and are spaced apart from each other in the axial direction thereof.

The sensor circuit portion 31, the drive control circuit portion 32, and the motor drive circuit 43A are electrically formed as independent circuits, and are constructed without using any electrical isolation circuit, etc. as in the prior art.

Figure 2:
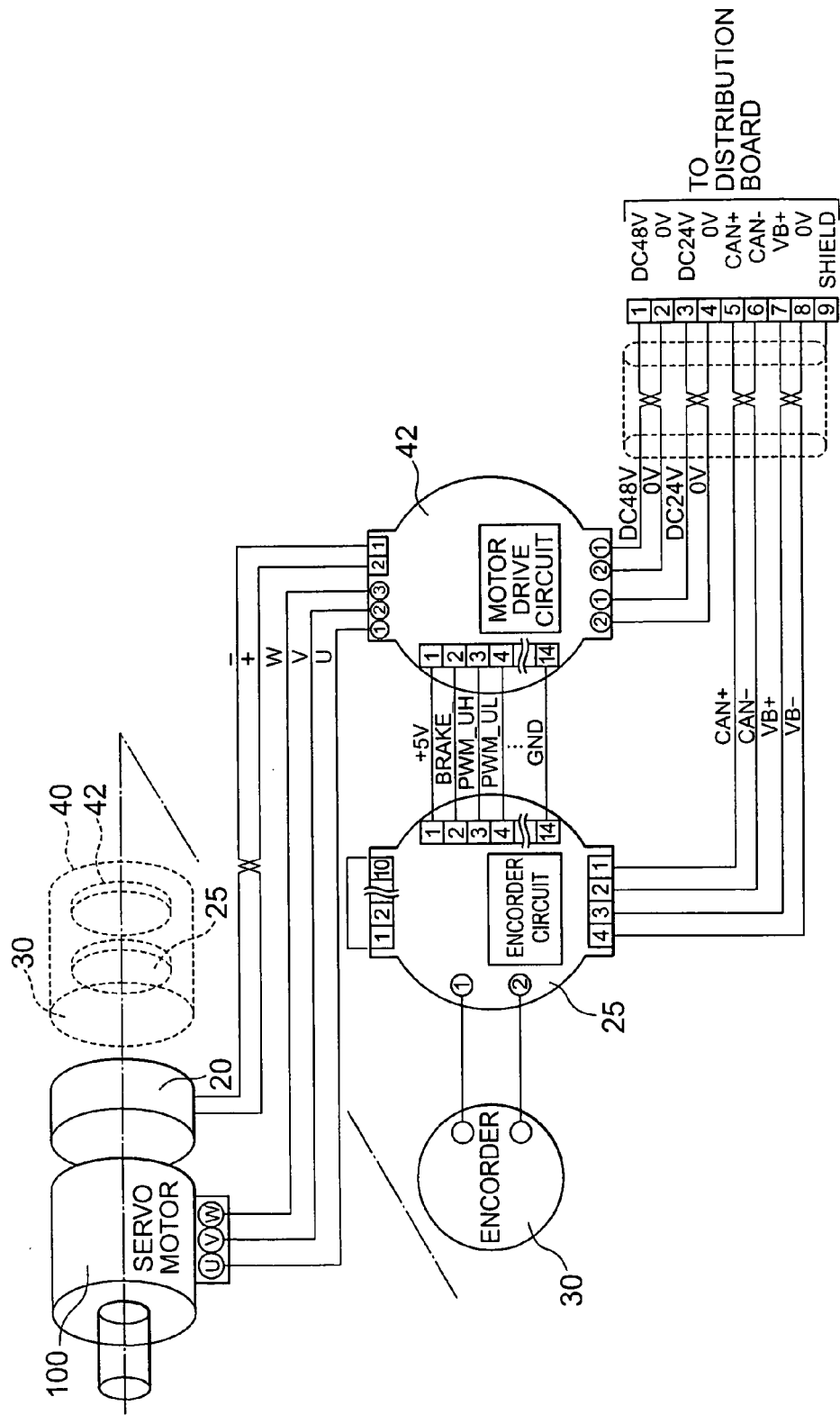
FIG. 2 is a schematic diagram showing an electrical construction of each portion of FIG. 1.

Note that the boards 25 and 42 of FIG. 1 described above are constructed as shown in the schematic diagram of FIG. 2, which shows how they are electrically connected.

Next, the operation of this embodiment will be described. First, in the above-described construction, the electromagnetic drive portion 9 operates to pull the movable brake plate 13 to thereby release the brake 20 at the same time as turning-on of the power supply, and the servo motor portion 100 starts rotation on the basis of a position signal (interswitching signal) from the encoder 30. Thereafter, servo drive of the servo motor portion 100 starts based on a command signal (not shown) from outside and an encoder signal from the encoder 30.

The servo motor with a built-in drive circuit according to the present invention, constructed as described above, provides the following effects.

Due to the arrangement in which the sensor circuit board having the sensor circuit portion and the drive control circuit portion and the motor drive board having the motor drive circuit are inside the sensor cover of the sensor circuit board, it is possible to realize a servo motor with a built-in drive circuit which is the same size as the conventional servo motor without a built-in drive circuit, thereby achieving a more substantial reduction in size and space saving.

Further, the sensor circuit portion, the drive control circuit portion, and the motor drive circuit can be electrically connected without using any isolation circuit between two boards, thereby achieving simplification and a reduction in the size of circuit configuration.

What is claimed is:

1. A brushless servo motor comprising:
   a servo motor portion comprising a stator, a rotor, and an absolute encoder;
   a sensor circuit board having a front side and a rear side, wherein the absolute encoder includes a light receiving member provided on the front side of the sensor circuit board;
   a sensor circuit portion provided on the rear side of the sensor circuit board;
   a drive control circuit portion provided on the rear side of the sensor circuit board;
   a sensor cover provided at a rear end of the servo motor portion and covering the absolute encoder, the sensor cover being formed with a plurality of cooling fins; and
   a motor drive board connected to an inner surface of the sensor cover, the motor drive board having a power device which is held in contact with an inner surface of the sensor cover.

2. The brushless servo motor as claimed in claim 1, wherein the sensor cover is formed of aluminum.

3. The brushless servo motor as claimed in claim 2, wherein the sensor circuit board and the motor drive board are arranged side by side inside the sensor cover and are axially spaced apart from each other, and the outer diameters of the sensor circuit board and the motor drive board are smaller than an inner diameter of the sensor cover and an outer diameter of the servo motor portion.

4. A brushless servo motor comprising:
   a cylindrical casing;
   a front cover connected to a front end of the cylindrical casing;
   a rear cover connected to a rear end of the cylindrical casing;
   a sensor circuit board connected via a connection member to a rear side of the rear cover;
   a servo motor portion comprising a stator, a rotor, and an absolute encoder, wherein the stator and the rotor are disposed in the cylindrical casing, and the absolute encoder comprises a code plate, a light emitting member provided on the rear cover, and a light receiving member provided on a front side of the sensor circuit board;
   a rotation shaft connected to the rotor and rotatably supported by bearings in the front and rear covers, the rotation shaft having a protruding shaft portion extending through the rear cover, wherein the code plate is provided on the protruding shaft portion and the sensor circuit board is positioned rearwardly of the code plate;
   a drive control circuit portion provided on a rear side of the sensor circuit board;
   a sensor circuit portion for performing power and signal processing on the absolute encoder and supplying an encoder signal to the drive control circuit portion, the sensor circuit portion being provided on a rear side of the sensor circuit board;
   a sensor cover mounted on the rear side of the rear cover so as to cover the absolute encoder, the sensor cover being formed with a plurality of cooling fins; and
   a motor drive board connected to an inner surface of the sensor cover, the motor drive board having a power device in contact with an inner surface of the sensor cover.

5. The brushless servo motor as claimed in claim 4, further comprising a motor drive circuit disposed on the motor drive board.

6. The brushless servo motor as claimed in claim 5, wherein the sensor cover is formed of aluminum.

7. The brushless servo motor as claimed in claim 6, wherein the sensor circuit board and the motor drive board are arranged side by side inside the sensor cover and are axially spaced apart from each other.

8. The brushless servo motor as claimed in claim 7, wherein the outer diameter of the sensor circuit board and the outer diameter of the motor drive board are smaller than an inner diameter of the sensor cover and an outer diameter of the servo motor portion.

* * * * *